US011272591B1

(12) United States Patent
Lee

(10) Patent No.: US 11,272,591 B1
(45) Date of Patent: Mar. 8, 2022

(54) CONSTANT POWER LIGHT EMITTING DIODE (LED) DRIVER

(71) Applicant: Allegro MicroSystems, LLC, Manchester, NH (US)

(72) Inventor: Nai-Chi Lee, Nashua, NH (US)

(73) Assignee: Allegro MicroSystems, LLC, Manchester, NH (US)

( * ) Notice: Subject to any disclaimer, the term of this patent is extended or adjusted under 35 U.S.C. 154(b) by 0 days.

(21) Appl. No.: 17/109,215

(22) Filed: Dec. 2, 2020

(51) Int. Cl.
| H05B 45/14 | (2020.01) |
| H05B 45/375 | (2020.01) |
| H02H 3/20 | (2006.01) |
| H05B 45/54 | (2020.01) |
| H05B 45/38 | (2020.01) |

(52) U.S. Cl.
CPC ............ *H05B 45/14* (2020.01); *H02H 3/207* (2013.01); *H05B 45/375* (2020.01); *H05B 45/38* (2020.01); *H05B 45/54* (2020.01)

(58) Field of Classification Search
CPC ...... H05B 45/14; H05B 45/375; H05B 45/38; H05B 45/54; H02H 3/207
See application file for complete search history.

(56) References Cited

U.S. PATENT DOCUMENTS

| 6,982,527 | B2 | 1/2006 | Lee et al. |
| 7,675,245 | B2 | 3/2010 | Szczeszynski et al. |
| 7,999,487 | B2 | 8/2011 | Szczeszynski |
| 8,035,315 | B2 * | 10/2011 | Zhao ................... H05B 45/3725 315/299 |
| 8,169,161 | B2 | 5/2012 | Szczeszynski et al. |
| 8,274,238 | B2 | 9/2012 | Szczeszynski et al. |
| 8,339,049 | B2 | 12/2012 | Kang et al. |
| 8,456,105 | B2 | 6/2013 | Wang et al. |
| 8,482,225 | B2 | 7/2013 | Szczeszynski |
| 8,519,630 | B2 | 8/2013 | Wang et al. |
| 8,610,371 | B2 | 12/2013 | Lee et al. |
| 8,653,756 | B2 | 2/2014 | Szczeszynski et al. |
| 8,664,930 | B2 | 3/2014 | Kang et al. |

(Continued)

OTHER PUBLICATIONS

Allegro Microsystems, "Wide Input Voltage Range, High-Efficiency, Fault-Tolerant LED Driver", A8519 and A8519-1 Datasheet, Mar. 14, 2019, 38 pages.

(Continued)

*Primary Examiner* — Daniel D Chang
(74) *Attorney, Agent, or Firm* — Daly, Crowley, Mofford & Durkee, LLP

(57) ABSTRACT

An LED driver includes a voltage detector and a controller. The voltage detector is configured to couple to an LED string comprising a plurality of series-coupled LEDs and to detect a voltage across the LED string to generate a feedback signal. The controller is configured to control an amount of current provided to the LED string in response to the feedback signal, with an amount of power provided to the LED string being substantially constant. The voltage detector can be coupled in parallel with the LED string, and may be a resistor divider. The controller is further configured to couple to a DC-DC converter comprising a switch controlled by the controller and configured to generate an output current and an output voltage coupled to the LED string to provide the amount of power to the LED string.

28 Claims, 4 Drawing Sheets

(56) References Cited

U.S. PATENT DOCUMENTS

| | | | |
|---|---|---|---|
| 8,692,482 B2 | 4/2014 | Szczeszynski et al. | |
| 8,742,682 B1 | 6/2014 | Wang et al. | |
| 8,901,835 B2 | 12/2014 | Kang et al. | |
| 8,937,433 B1 | 1/2015 | Wang et al. | |
| 8,957,607 B2 | 2/2015 | Raval et al. | |
| 8,994,279 B2 | 3/2015 | Raval et al. | |
| 9,007,000 B2 | 4/2015 | Szczeszynski et al. | |
| 9,144,126 B2 | 9/2015 | Raval et al. | |
| 9,155,156 B2 | 10/2015 | Szczeszynski | |
| 9,265,104 B2 | 2/2016 | Szczeszynski et al. | |
| 9,320,094 B2 | 4/2016 | Szczeszynski et al. | |
| 9,337,727 B2 | 5/2016 | Szczeszynski et al. | |
| 9,379,690 B2 | 6/2016 | Humphrey et al. | |
| 9,379,708 B2 | 6/2016 | Martin et al. | |
| 9,538,601 B1 | 1/2017 | Mangtani et al. | |
| 9,615,413 B2 | 4/2017 | Raval et al. | |
| 9,621,036 B2 | 4/2017 | Wibben | |
| 9,642,203 B2 | 5/2017 | Lee et al. | |
| 9,774,257 B2 | 9/2017 | Wibben et al. | |
| 9,781,789 B1 | 10/2017 | Lee et al. | |
| 9,825,528 B2 | 11/2017 | Lee et al. | |
| 9,999,107 B1 | 6/2018 | Rivas et al. | |
| 10,039,171 B1 * | 7/2018 | Li | H05B 45/14 |
| 10,088,533 B2 | 10/2018 | Rivas et al. | |
| 10,219,344 B2 | 2/2019 | Rivas et al. | |
| 10,411,600 B1 | 9/2019 | Challa et al. | |
| 10,412,797 B2 | 9/2019 | Lee | |
| 2014/0117874 A1 * | 5/2014 | Matsumoto | H05B 45/14 315/291 |

OTHER PUBLICATIONS

Allegro Microsystems, "LED Driver with Pre-Emptive Boost for Ultra-High Dimming Ratio and Low Output Ripple", ALT80600 / ALT80600-1 Datasheet, Jan. 6, 2021, 36 pages.

* cited by examiner

CONSTANT POWER LIGHT EMITTING DIODE (LED) DRIVER

CROSS REFERENCE TO RELATED APPLICATIONS

Not Applicable.

STATEMENT REGARDING FEDERALLY SPONSORED RESEARCH

Not Applicable.

FIELD

The present disclosure relates generally to an LED driver and related techniques for providing substantially constant power and luminosity to one or more LED string(s).

BACKGROUND

Light emitting diode (LED) driver circuits that drive one or more parallel-coupled strings of series-coupled light emitting diodes are often implemented in the form of an integrated circuit (IC). LEDs are commonly used in automotive applications, such as a tail lights, daytime running lights (DRL), rear combination lights (RCL), and interior lighting, for example. In many automotive lighting applications, strict safety regulations require that luminosity (total light output) from the LED string(s) remain substantially constant, for example to within ±10%.

Some LED drivers cause a substantially constant current to be provided to the LED string(s), for example a current that is constant to within 2-3% of a target value, in an effort to achieve consistent luminosity. The forward voltage of an LED can drop linearly with increasing junction temperature. For example, when an LED junction heats up by 100° C., its forward voltage typically drops by approximately 10%. Thus, in a constant-current regulated LED driver, under these conditions, the power consumption likewise drops by 10% and the luminosity thus drops by 10%, which can cause a noticeable change in brightness of the LED string. A drop in light efficacy at high temperatures can cause the brightness to decrease by more than approximately 10%.

One possible solution is to use a negative temperature coefficient (NTC) thermistor mounted to the LED module heatsink to provide temperature compensation for the LED current. However, in addition to the thermistor adding cost, the heatsink heats up much slower than the LED junction, so the compensation provided by the thermistor may not be reliable at least until thermal equilibrium is established.

Because of the requirement for substantially constant luminosity, a common safety feature is the so-called 'one-out-all-out' feature, which requires that if one single LED in an LED string is shorted, the whole string must be shut down. However, this seemingly protective feature can create an unnecessary hazard; for example, while driving at night, a headlight can suddenly become completely dark because of this 'safety feature'.

SUMMARY

The present disclosure provides an LED driver configured to deliver a substantially constant amount of power to one or more LED string(s). The LED driver includes a voltage detector configured to couple to an LED string including a plurality of series-coupled LEDs and to detect a voltage across the LED string to generate a feedback signal and the controller configured to control an amount of current provided to the LED string in response to the feedback signal, and wherein an amount of power provided to the LED string is substantially constant.

Features may include one or more of the following individually or in combination with other features. The voltage detector may be coupled in parallel with the LED string. The voltage detector may include a resistor divider. The controller may be further configured to couple to a DC-DC converter, the DC-DC converter including a switch controlled by the controller and configured to generate an output current and an output voltage coupled to the LED string to provide the amount of power to the LED string. The LED driver may further include an error amplifier responsive to the output current and to a target current level to generate an error signal coupled to the controller. The LED driver may further include a correction unit responsive to the feedback signal and configured to determine the target current level. The correction unit may be configured to apply an inverse function to the feedback signal. In some embodiments, the correction unit includes a look-up table. In some embodiments, the correction unit is configured to apply a linear function with a negative slope to the feedback signal. A fault detection circuit may be configured to generate a fault signal to indicate a fault when at least one LED of the LED string is shorted. The LED driver may further include at least one of an overvoltage protection circuit coupled to the controller and configured to disable the controller in response to detection of an overvoltage condition based on the feedback signal and an undervoltage protection circuit coupled to the controller and configured to disable the controller in response to detection of an undervoltage condition based on the feedback signal. The overvoltage protection circuit may be further configured to generate an overvoltage fault signal upon detection of the overvoltage condition and the undervoltage protection circuit may be further configured to generate an undervoltage fault signal upon detection of the undervoltage condition. The LED driver may further include an overcurrent protection circuit configured to detect an overcurrent condition based on the target current level. The overcurrent protection circuit may be further configured to generate an overcurrent fault signal upon detection of the overcurrent condition. A substantially constant luminosity may be provided by the LED string when at least one LED is shorted.

According to a further aspect, a method includes detecting, by a voltage detector coupled to an LED string including a plurality of series-coupled LEDs, a voltage across the LED string to generate a feedback signal and controlling, by the controller, an amount of current provided to the LED string in response to the feedback signal, wherein an amount of power provided to the LED string is substantially constant.

Features may include one or more of the following individually or in combination with other features. Controlling the amount of current may include controlling, by the controller, a switch of a DC-DC converter, wherein the DC-DC converter generates an output current and an output voltage coupled to the LED string to provide the amount of power to the LED string. The method may further include generating an error signal in response to the feedback signal and to a target current level and providing the error signal to the controller. The method may further include determining the target current level with a correction unit responsive to the feedback signal. Determining the target current level may include applying an inverse function to the feedback signal by the correction unit. In embodiments, the correction unit may include a look up table. In some embodiments, determining the target current level may include applying a linear function with a negative slope to the feedback signal. The method may further include generating a fault signal to indicate a fault when at least one LED in the LED string is shorted. The method may further include disabling the controller in response to detection of an overvoltage condition by an overvoltage protection circuit based on the feedback signal or in response to detection of an undervoltage condition by an undervoltage protection circuit based on the feedback signal. The method may further include generating an overcurrent condition signal upon detection of an overcurrent condition based on the target current level.

Also described is apparatus including means for detecting a voltage across an LED string to generate a feedback signal, the LED string including a plurality of series-coupled LEDs and means for controlling an amount of current provided to the LED string in response to the feedback signal, wherein an amount of power provided to the LED string is substantially constant. The controlling means may include means for controlling a switch of a DC-DC converter that generates an output current and an output voltage coupled to the LED string to provide the amount of power to the LED string. The apparatus may further include error signal generating means for generating an error signal for coupling to the controlling means, wherein the error signal generating means is responsive to the output current and a target current level. The apparatus may further include means for determining the target current level by applying an inverse function to the feedback signal. The apparatus may further include means for determining the target current level by applying a linear function with a negative slope to the feedback signal.

BRIEF DESCRIPTION

The foregoing features may be more fully understood from the following description of the drawings. The drawings aid in explaining and understanding the disclosed technology. Since it is often impractical or impossible to illustrate and describe every possible embodiment, the provided figures depict one or more illustrative embodiments. Accordingly, the figures are not intended to limit the scope of the broad concepts, systems and techniques described herein. Like numbers in the figures denote like elements.

DETAILED DESCRIPTION

Figure 1:
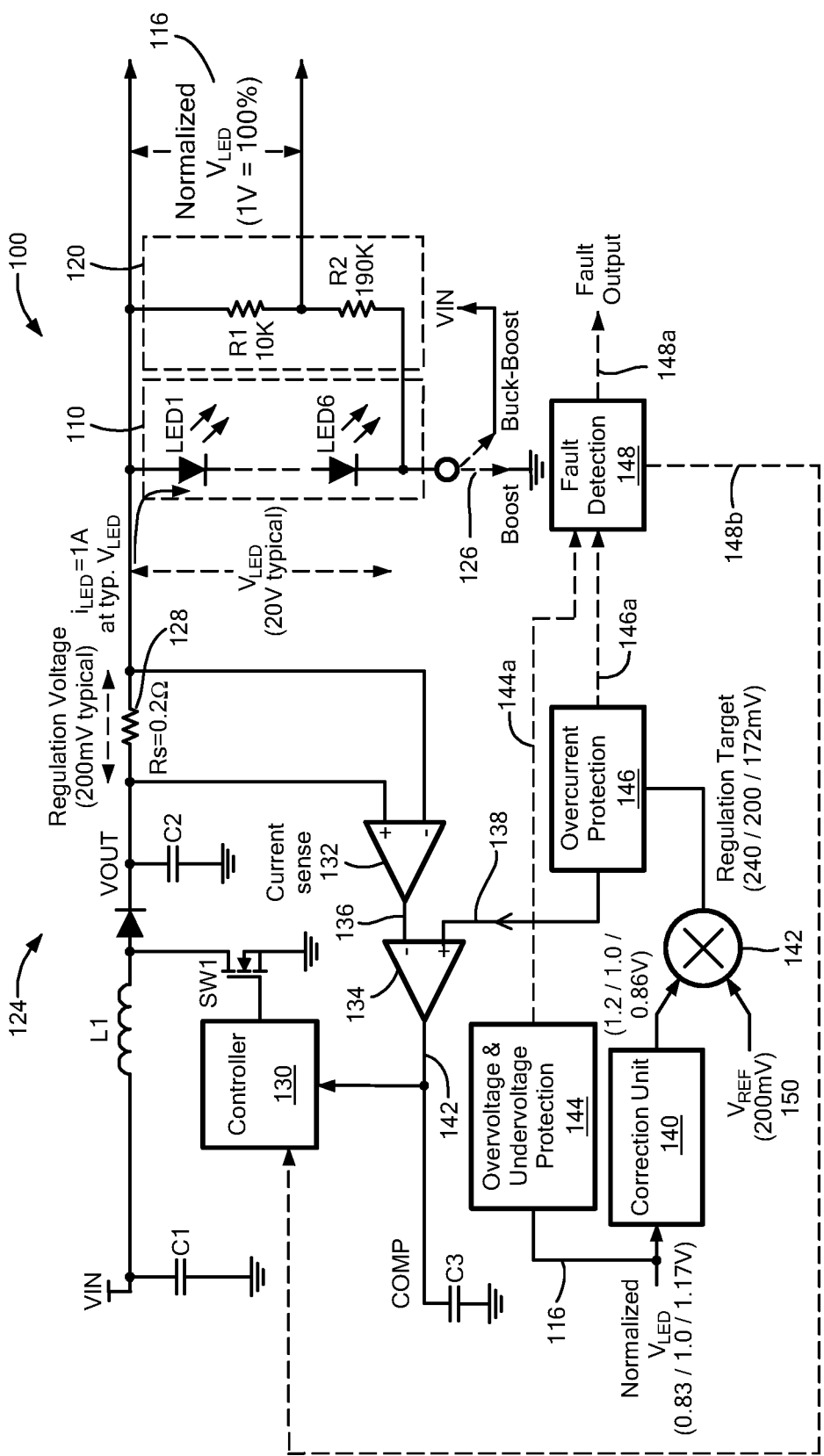
FIG. 1 is a schematic diagram of an LED driver circuit configured to provide a constant amount of power to an LED string including a plurality of series-coupled LEDs, according to the present disclosure.

Referring to FIG. 1, an LED driver circuit 100 is configured to provide a constant amount of power to an LED string 110 including a plurality of series-coupled LEDs, according to the present disclosure. The LED driver circuit 100 is configured to detect a voltage $V_{LED}$ across the LED string to generate a feedback signal that is used to control the amount of current provided to the LED string in a manner that maintains the LED power to be substantially constant. By regulating the amount of power, rather than an amount of LED current for example, the luminosity of the LED string can remain substantially constant as is desirable.

The LED driver circuit 100 includes a voltage detector 120 and a controller 130. The voltage detector 120 is configured to couple to the LED string 110 including the plurality of series-coupled LEDs, here shown to include LED1 to LED6. The voltage detector 120 is configured to detect a voltage, $V_{LED}$, across the LED string to generate a feedback signal, normalized $V_{LED}$, 116. The voltage detector 120 may take various forms, such as the illustrated resistor divider, including resistors R1 and R2.

The controller 130 is configured to control an amount of power provided to the LED string 110 in response to the feedback signal 116. The amount of power provided to the LED string 120 is substantially constant, as established by a correction unit 140. In embodiments, the LED power can vary by approximately +/−3%, for example. Such a power variation range can correspond to a luminosity variation range on the order of +/−5% which satisfies some manufacturer (e.g., automobile manufacturer) requirements of LED luminosity variation being less than +/−10%.

The controller 130 is configured to couple to a DC-DC converter 124 including a switch SW1 and inductor L1. The switch SW1 may take the form of a Metal Oxide Semiconductor Field Effect Transistor (MOSFET) device having a control terminal (e.g., a gate terminal) coupled to receive a control signal from the controller 130 and configured to generate an output current, or LED current, $i_{LED}$, and an output voltage, VOUT, coupled to the LED string 110 to provide power to the LED string. The DC-DC converter 124 is coupled to receive an input voltage VIN from power supply or battery (not shown) across a capacitor C1 and may further include an output capacitor C2 as shown. A current sensor 128 is coupled to sense the LED current $i_{LED}$ and may take various forms, such as the illustrated current sensor resistor. The illustrated DC-DC converter 124 can be configurable by a switch 126 to operate in a Boost mode, Buck mode, or in a Buck-Boost mode depending on input voltage levels and output voltage and other system requirements. It will be appreciated however that the DC-DC converter can take various forms.

The LED driver 100 includes an error amplifier 134 responsive to a signal 136 indicative of the sensed LED current $i_{LED}$ and to a target current level signal 138 that corresponds to a desired, target LED current $i_{LED}$. The error amplifier 134 is configured to generate an error signal 142 indicative of a difference between the LED current $i_{LED}$ and the target current level signal 138 and thus, indicative of the duty cycle of the switch SW1 necessary to provide the target current to the LED string. The error signal 142 is coupled to the controller 130, as may take the form of a PWM controller, to control the switch SW1 such that the LED current $i_{LED}$ is increased or decreased as necessary for the current signal 136 to match the target current level signal 138. The signal 136 can be provided by a current amplifier 132 which amplifier can have inputs coupled across sense resistor 128, as shown.

According to the disclosure, the target current level signal 138 can be provided by multiplying (with a multiplier 142) an output of a correction unit 140 by a reference level 150.

The correction unit 140 can be responsive to the feedback signal 116 and configured to apply an inverse function to the feedback signal 116 (i.e., to provide a "1/x" version of the feedback signal). With this arrangement, the correction unit 140 is configured to establish the target current level signal 138 at a level that causes the LED power to remain substantially constant. More particularly, as the normalized voltage 116 decreases (e.g., as may occur due to increased LED junction temperatures), the LED current $i_{LED}$ increases in an inversely proportional fashion. The result is that the power consumption of the LED string, $V_{LED} \times i_{LED}$, remains substantially constant even with changing voltage drop across the LED string as may occur due to the affect of temperature variations on the LED string and/or due to one or more than one of the LEDs of the string becoming shorted.

The correction unit 140 can include a look-up table to provide the inverse value of the feedback signal 116 in some embodiments. In such an embodiment, the correction unit 140 can take the form of a table of values stored in a memory. Alternatively, the correction unit 140 can include a processor configured to compute an inverse value of the normalized voltage $V_{LED}$.

It will be appreciated that although control based on application of an inverse function provides a first order compensation to maintain a constant power, additional factors can be taken into consideration and used to provide the target current level signal 138. For example, characteristics of the actual LEDs can be used to generate values stored in a look-up table for use in determining the target current level signal 138.

The LED driver circuit 100 can include an overvoltage and undervoltage protection circuit 144 configured to detect an overvoltage condition and an undervoltage condition based on the feedback signal 116. The overvoltage and undervoltage protection circuit 144 can provide a voltage fault signal, or flag 144a to a fault detection circuit 148. The overvoltage and undervoltage protection circuit 144 can take various forms. In an example embodiment, the protection circuit 144 can include one or more comparators coupled to receive the feedback signal 116 indicative of the output voltage and a reference voltage selected to establish a fault set point or trip point for the over and under voltage detections. Example trip points are described in connection with FIG. 2. In this example, the overvoltage trip point is set at 125% of the nominal LED string voltage, while the undervoltage trip point is set at 80% of the nominal value.

The LED driver circuit 100 can include an overcurrent protection circuit 146 configured to detect an overcurrent condition based on the target current level signal 138. The overcurrent protection circuit 146 can provide a current fault signal, or flag 146a to the fault detection circuit 148. The overcurrent protection circuit 146 can operate to limit the target current level signal 138 and thereby limit or clamp the LED current $i_{LED}$. For example, the overcurrent protection circuit 146 can take the form of a comparator configured to compare the output of the multiplier 142 to a limit. Example overcurrent limits are described in connection with FIG. 2. In this example, the overcurrent protection limit is set at 125% of the nominal LED current. Note that this limit is selected to coincide with the undervoltage trip point of 80%, because 1/0.8=1.25. However, it will be appreciated by those of ordinary skill in the art that other protection limits may be selected to suit particular application requirements.

The fault detection circuit 148 can be coupled to receive the overvoltage and undervoltage signal 144a and the overcurrent signal 146a. In some embodiments, the fault detection circuit 148 operates to generate a fault signal 148a to indicate one or more of an overvoltage condition, an undervoltage condition, or an overcurrent condition. Elements of the driver circuit 100 can be provided in the form of an integrated circuit (IC) and the fault signal 148a can be provided as an output of the IC (i.e., can be provided at a pin or other connection point) in order to communicate the fault to an off-chip controller, system or other components. Additionally or alternatively, the fault detection circuit 148 can disable the controller 130 in response to detection of certain faults. As one non-limiting example, the fault detection circuit 148 can disable the controller via a disable signal 148b when an overvoltage condition or an overcurrent condition is detected.

With the LED driver circuit 100, a substantially constant luminosity is provided by the LED string 110 even when one or possibly more than one LED is shorted. For example, consider the example that there are 8 LEDs in a string, the voltage drop across the string is 24V, and the normalized $V_{LED}$ voltage is 1V. If one LED becomes shorted, the voltage drop across the string drops to 21V, and the normalized $V_{LED}$ voltage will drop to 0.875V. According to the present disclosure, the LED current $i_{LED}$ increases by the same percentage that the normalized voltage decreases (i.e., by 14%, because 1/0.875=1.143). The result is that the output power remains the same, and thus the luminosity remains nearly constant. This arrangement is in contrast to conventional constant-current LED drivers in which an LED string may be required to be disabled when a single LED becomes shorted in order to avoid inconsistent luminosity (a requirement that is sometimes referred to as "one-out-all-out"). Advantageously, the one-out-all-out failure can be avoided by the application of constant-power to the LED string according to the present disclosure.

Consider the example of FIG. 1, in which the LED string 110 includes 6 LEDs in series, with a typical voltage drop across the LED string of $V_{LED}$=20V. This gives an output power of 20 W assuming $i_{LED}$=1 A at 20V. If the LED string were increased to include 7 LEDs in series or decreased to 5 LEDs in series, the LED current will decrease or increase to maintain a constant 20 W output as shown in the table below:

| #LED | V_LED (V) | Normalized V_LED (V) | 1/V_LED | Regulation Target (mV) | i_LED (A) | LED Power (W) |
|---|---|---|---|---|---|---|
| 5 | 16.7 | 0.83 | 1.20 | 240 | 1.20 | 20.00 |
| 6 | 20.0 | 1.00 | 1.00 | 200 | 1.00 | 20.00 |
| 7 | 23.3 | 1.17 | 0.86 | 172 | 0.86 | 20.00 |

It will be appreciated that due to secondary factors (factors other than temperature), the percentage drop in LED luminosity can be greater than the drop in forward voltage of the LED, $V_{LED}$. Accordingly, in some embodiments, the LED current $i_{LED}$ can be increased slightly faster than the detected drop in LED voltage $V_{LED}$. For example, the LED current $i_{LED}$ can be increased using a look-up table provided in the correction unit. The look-up table can contain values based on actual characteristics of LED current versus luminosity.

Figure 2:
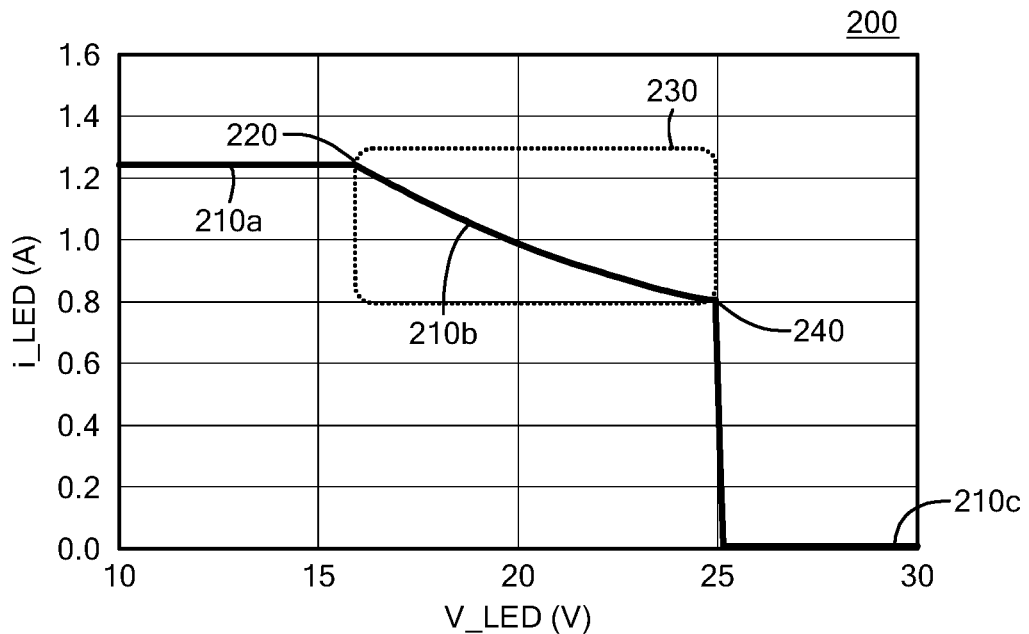
FIG. 2 is a graph showing waveforms for overcurrent protection operation, constant power operation, and overvoltage protection operation, as implemented by the LED driver circuit, according to the present disclosure.

FIG. 2 is a graph 200 showing LED current in three operation regions: overcurrent protection operation (210a), constant power operation (210b), and overvoltage protection operation (210c), as may be implemented by the LED driver circuit 100, according to the present disclosure. Protection circuits (i.e., overvoltage and undervoltage protection circuit 144 and overcurrent protection circuit 146) operate to set the upper and lower limits for either LED string voltage or current. For example, the limit could be set at +/−25% for LED current. So if 1 out of 6 LEDs in a string were shorted, the LED current would increase by 20% in order to maintain constant power. But if 2 out of 6 LEDs were shorted, the LED current would only increase by 25% (instead of 50%). This is to prevent damage of LED due to excessive current. The upper and lower current and voltage limits could be set by the IC (i.e., preprogrammed, preset, or predetermined values) or could be user-programmable.

In graph 200, the LED current $i_{LED}$ 210 is shown as a function of the LED voltage. LED current portion 210a illustrates overcurrent protection as may be implemented by protection circuit 144 for low LED voltage conditions. Here overcurrent protection occurs until point 220 (i.e., the LED current $i_{LED}$ is clamped at approximately 1.25 amps). Once the LED voltage $V_{LED}$ reaches a predetermined level at point 220, such as the illustrated 16 volts for example, constant power operation occurs.

Portion 210b of the LED current $i_{LED}$ 210 represents constant power operation phase 230 during which the power consumption of the LED string 110 is maintained at a substantially constant level by operation of the feedback loop including the correction unit 140 as explained above.

LED current portion 210c illustrates overvoltage protection as may be implemented by protection circuit 144 for high LED voltage conditions. Here, overvoltage protection is implemented for LED voltages greater than at point 240, when the LED voltage $V_{LED}$ exceeds a predetermined level, such as the illustrated 25 volts for example.

Figure 3:
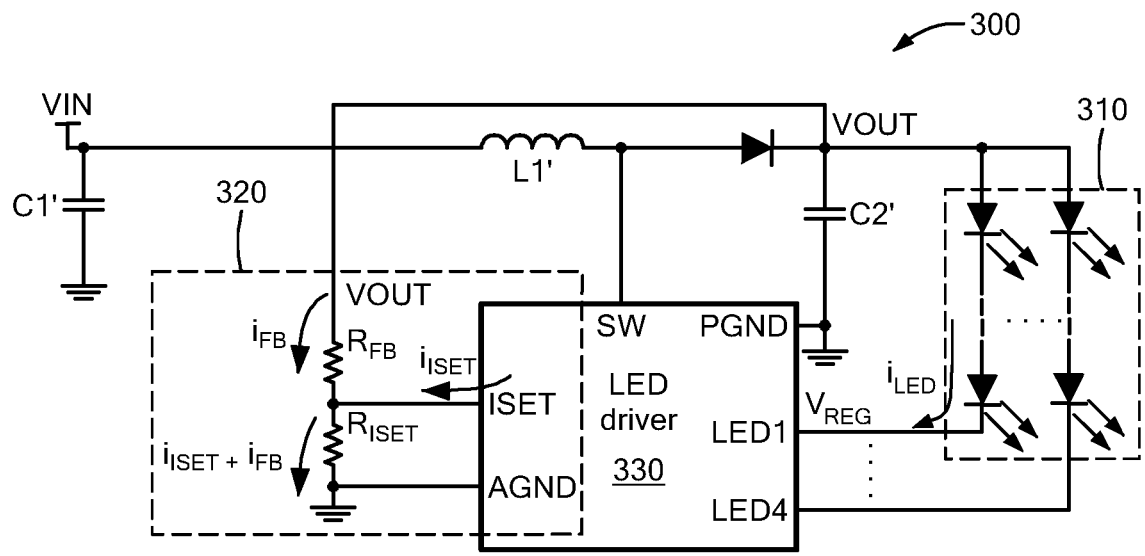
FIG. 3 is a schematic diagram of an LED driver integrated circuit (IC) modified to have a voltage detector, according to the present disclosure.

According to a further aspect of the disclosure, FIG. 3 is a schematic diagram of an LED driver circuit 300 that operates on the same substantially constant power principle described above in conjunction with driver 100 of FIG. 1, but which utilizes an existing current-regulating LED driver (IC) 330 in order to implement a 'nearly constant power' LED driver 300. More particularly, rather than applying an inverse function as described above in conjunction with FIG. 1, the driver configuration of FIG. 3 applies a linear relationship between the LED current $i_{LED}$ and the LED voltage $V_{LED}$.

The LED driver circuit 300 can include a current regulating driver IC 330 and a correction unit 320 configured to be coupled to the LED string 310 and receive a feedback signal as may take the form of the LED current $i_{LED}$. The correction unit 320 and driver IC 330 can be configured to apply a linear function to the feedback signal $i_{LED}$. More particularly, a set current $i_{SET}$ can be established by the LED current $i_{LED}$ divided by a gain term, A, of the driver 330. In an example embodiment, the gain A is 833. A resistor divider (as can be referred to as the correction unit), including resistors $R_{FB}$ and $R_{ISET}$, can set the LED current to vary linearly with variations in the output voltage in order to thereby change the output voltage VOUT as necessary to maintain a substantially constant LED power. The driver IC 330 can include an internal switch controlled by the set current $i_{SET}$ in order to provide the necessary voltage at the SW connection in order to generate the necessary output voltage VOUT. More particularly, the relationship between the resistors $R_{FB}$ and $R_{ISET}$ and the set current $i_{SET}$ can be given by the following equation which can be used to select the resistor values:

$$R_{ISET}=V_{ISET}/(i_{SET}+i_{FB})=V_{ISET}/(i_{LED}/A(VOUT-V_{ISET})/R_{FB})$$

where $V_{ISET}$ is approximately 1 volt and $i_{FB}$ is a feedback current given by the output voltage divided by resistors $R_{FB}$ and $R_{SET}$. By re-arranging the equation above:

$$i_{LED}=i_{SET}*A=(V_{ISET}/R_{ISET})*A-((VOUT-V_{ISET})/R_{FB})*A$$

Since VOUT$\gg V_{ISET}$, the above can be approximated by:

$$i_{LED}=(V_{ISET}/R_{ISET})*A-(VOUT/R_{FB})*A$$

This shows that the LED current varies as a linear function (with a negative slope) with respect to VOUT.

The LED driver IC 330 can take various forms. One suitable example is the A8519 Driver of Allegro MicroSystems, LLC of Manchester, N.H. in which the current flowing out from the ISET pin is used to control the LED current.

Figure 4:
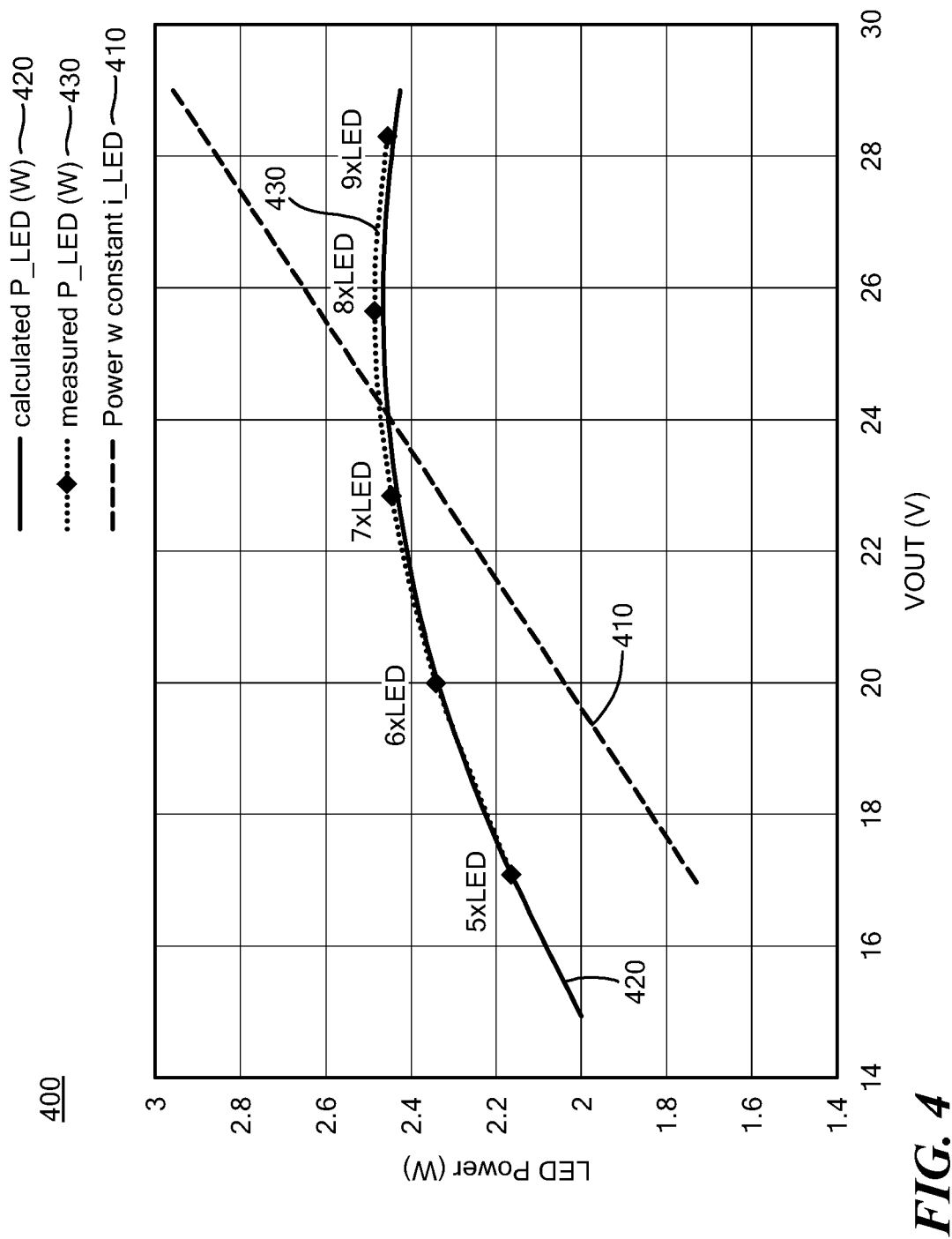
FIG. 4 is a graph showing example characteristics of the LED power as a function of output voltage, for both a constant-current prior art implementation and a constant-power implementation, according to the present disclosure.

FIG. 4 is a graph showing example waveforms of measured and calculated LED power as a function of output voltage VOUT. Power waveform 410 represents operation of a conventional constant current LED driver. Power waveform 420 illustrates operation of the constant power implementation according to the configuration of FIG. 3, as calculated, and waveform 430 illustrates operation of the constant power implementation according to the configuration of FIG. 3, as measured. Consideration of waveform 420 or 430 reveals that the LED power remains nearly constant when the number of LEDs in the LED string 310 is changed from 8 LEDs to 9 LEDs or to 7 LEDs. Thus, the driver circuit 300 and associated techniques can address the shorted fault condition without requiring shut down for a single LED fault (i.e., the one-out-all-out requirement) without sacrificing consistent luminosity.

Figure 5:
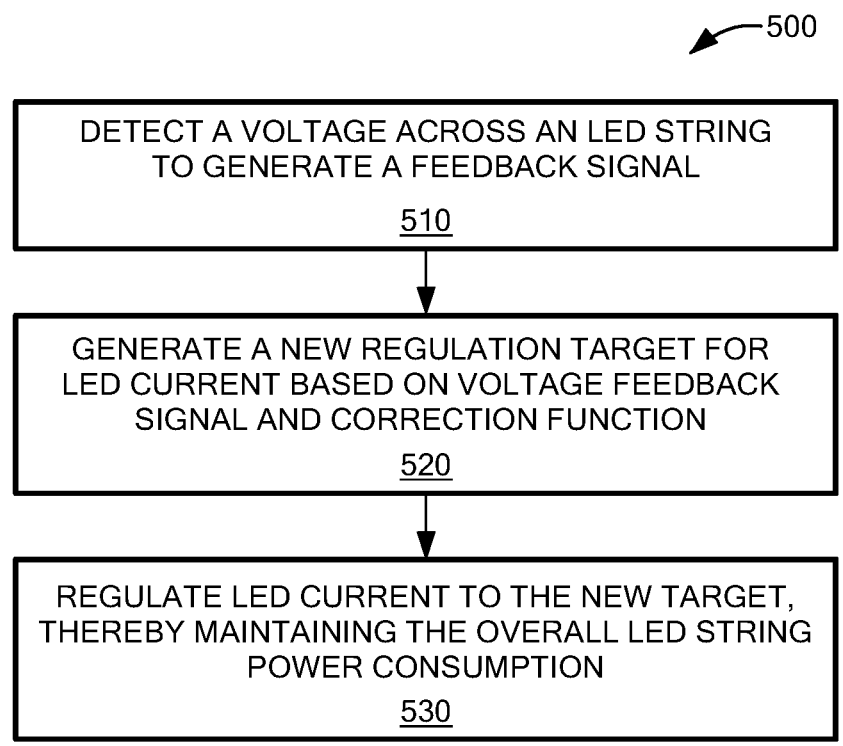
FIG. 5 is a flow chart illustrating an example method for providing constant power to an LED string, according to the present disclosure.

FIG. 5 is a flow chart illustrating an example method 500 for providing a constant amount of power to an LED string, according to the present disclosure.

At block 510, a parameter of the LED string is detected to generate a feedback signal. The parameter can be the normalized LED voltage, $V_{LED}$ as can be detected by the voltage detector 120 in FIG. 1. At block 520, a new regulation target for LED current is generated based on voltage feedback signal and correction function.

At block 530, an amount of current provided to the LED string (for example, LED string 110 in FIG. 1) is regulated to the new target, thereby maintaining the overall LED string power consumption. Controlling the amount of power can include controlling, by a controller (e.g., controller 130) a switch (e.g., switch SW1) of a DC-DC converter in response to a target current level signal. The target current level can be determined by a correction unit 140 responsive to the feedback signal, for example, by application of an inverse function to the feedback signal as shown in FIG. 1 or by application of a linear function with a negative slope to the feedback signal as shown in FIG. 3.

As used herein, the term "predetermined," when referring to a value or signal, is used to refer to a value or signal that is set, or fixed, in the factory at the time of manufacture, or by external means, e.g., programming, thereafter. As used herein, the term "determined," when referring to a value or signal, is used to refer to a value or signal that is identified by a circuit during operation, after manufacture.

Having described preferred embodiments of the present disclosure, it will now become apparent to one of ordinary skill in the art that other embodiments incorporating their concepts may be used. It is felt therefore that these embodiments should not be limited to disclosed embodiments, but rather should be limited only by the spirit and scope of the appended claims.

What is claimed is:

1. A light emitting diode (LED) driver, comprising:
a voltage detector configured to couple to an LED string comprising a plurality of series-coupled LEDs and to detect a voltage across the LED string to generate a feedback signal;
a controller configured to control an amount of current provided to the LED string in response to the feedback signal, wherein an amount of power provided to the LED string is substantially constant, wherein the controller is further configured to couple to a DC-DC converter, the DC-DC converter comprising a switch controlled by the controller and configured to generate an output current and an output voltage coupled to the LED string to provide the amount of power to the LED string,
an error amplifier responsive to the output current and to a target current level to generate an error signal coupled to the controller; and
a correction unit responsive to the feedback signal and configured to determine the target current level.

2. The LED driver of claim 1, wherein the voltage detector is coupled in parallel with the LED string.

3. The LED driver of claim 1, wherein the voltage detector comprises a resistor divider.

4. The LED driver of claim 1, wherein the correction unit is configured to apply an inverse function to the feedback signal.

5. The LED driver of claim 1, wherein the correction unit comprises a look-up table.

6. The LED driver of claim 1, wherein the correction unit is configured to apply a linear function with a negative slope to the feedback signal.

7. The LED driver of claim 1, further comprising a fault detection circuit configured to generate a fault signal to indicate a fault when at least one LED of the LED string is shorted.

8. The LED driver of claim 1, further comprising at least one of an overvoltage protection circuit coupled to the controller and configured to disable the controller in response to detection of an overvoltage condition based on the feedback signal and an undervoltage protection circuit coupled to the controller and configured to disable the controller in response to detection of an undervoltage condition based on the feedback signal.

9. The LED driver of claim 8, wherein the overvoltage protection circuit is further configured to generate an overvoltage fault signal upon detection of the overvoltage condition and the undervoltage protection circuit is further configured to generate an undervoltage fault signal upon detection of the undervoltage condition.

10. The LED driver of claim 1, further comprising an overcurrent protection circuit configured to detect an overcurrent condition based on the target current level.

11. The LED driver of claim 10, wherein the overcurrent protection circuit is further configured to generate an overcurrent fault signal upon detection of the overcurrent condition.

12. The LED driver of claim 1, wherein a substantially constant luminosity is provided by the LED string when at least one LED is shorted.

13. A method comprising:
detecting, by a voltage detector coupled to an LED string comprising a plurality of series-coupled LEDs, a voltage across the LED string to generate a feedback signal;
controlling, by a controller, an amount of current provided to the LED string in response to the feedback signal, wherein an amount of power provided to the LED string is substantially constant,
generating an error signal in response to the feedback signal and to a target current level and providing the error signal to the controller; and
determining the target current level with a correction unit responsive to the feedback signal.

14. The method of claim 13, wherein controlling the amount of power comprises controlling, by the controller, a switch of a DC-DC converter, wherein the DC-DC converter generates an output current and an output voltage coupled to the LED string to provide the amount of power to the LED string.

15. The method of claim 13, wherein determining the target current level comprises applying an inverse function to the feedback signal by the correction unit.

16. The method of claim 13, wherein the correction unit comprises a look up table.

17. The method of claim 13, wherein determining the target current level comprises applying a linear function with a negative slope to the feedback signal.

18. The method of claim 13, further comprising generating a fault signal to indicate a fault when at least one LED in the LED string is shorted.

19. The method of claim 13, further comprising disabling the controller in response to detection of an overvoltage condition by an overvoltage protection circuit based on the feedback signal or in response to detection of an undervoltage condition by an undervoltage protection circuit based on the feedback signal.

20. The method of claim 13, further comprising generating an overcurrent condition signal upon detection of an overcurrent condition based on the target current level.

21. An apparatus comprising:
means for detecting a voltage across an LED string to generate a feedback signal, the LED string comprising a plurality of series-coupled LEDs;
means for controlling an amount of current provided to the LED string in response to the feedback signal, wherein an amount of power provided to the LED string is substantially constant;
error signal generating means for generating an error signal for coupling to the controlling means, wherein the error signal generating means is responsive to the output current and a target current level; and
means for determining the target current level in response to the feedback signal.

22. The apparatus of claim 21, wherein the controlling means comprises means for controlling a switch of a DC-DC converter that generates an output current and an output voltage coupled to the LED string to provide the amount of power to the LED string.

23. The apparatus of claim 21, wherein the means for determining the target current level is configured to apply an inverse function to the feedback signal.

24. The apparatus of claim 21, further comprising means for determining the target current level using a look up table.

25. The apparatus of claim 21, further comprising means for determining the target current level by applying a linear function with a negative slope to the feedback signal.

26. A light emitting diode (LED) driver, comprising:
a voltage detector configured to couple to an LED string comprising a plurality of series-coupled LEDs and to detect a voltage across the LED string to generate a feedback signal;

a controller configured to control an amount of current provided to the LED string in response to the feedback signal, wherein an amount of power provided to the LED string is substantially constant, wherein the controller is further configured to couple to a DC-DC converter, the DC-DC converter comprising a switch controlled by the controller and configured to generate an output current and an output voltage coupled to the LED string to provide the amount of power to the LED string;

an error amplifier responsive to the output current and to a target current level to generate an error signal coupled to the controller; and a correction unit responsive to the feedback signal and configured to determine the target current level, wherein the correction unit comprises a look-up table.

27. A method comprising:

detecting, by a voltage detector coupled to an LED string comprising a plurality of series-coupled LEDs, a voltage across the LED string to generate a feedback signal; and controlling, by a controller, an amount of current provided to the LED string in response to the feedback signal, wherein an amount of power provided to the LED string is substantially constant, wherein controlling the amount of power comprises controlling a switch of a DC-DC converter, wherein the DC-DC converter generates an output current and an output voltage coupled to the LED string to provide the amount of power to the LED string;

generating an error signal in response to the feedback signal and to a target current level and providing the error signal to the controller; and determining the target current level with a correction unit responsive to the feedback signal, wherein the correction unit comprises a look up table.

28. An apparatus comprising:

means for detecting a voltage across an LED string to generate a feedback signal, the LED string comprising a plurality of series-coupled LEDs;

means for controlling an amount of current provided to the LED string in response to the feedback signal, wherein an amount of power provided to the LED string is substantially constant, wherein the controlling means comprises means for controlling a switch of a DC-DC converter that generates an output current and an output voltage coupled to the LED string to provide the amount of power to the LED string;

error signal generating means for generating an error signal for coupling to the controlling means, wherein the error signal generating means is responsive to the output current and a target current level; and means for determining the target current level using a look up table.

* * * * *